United States Patent [19]
Dickey

[11] Patent Number: 4,923,557
[45] Date of Patent: May 8, 1990

[54] APPARATUS AND METHOD FOR APPLYING A HEAT SHRINK FILM TO A CONTAINER

[75] Inventor: Daniel M. Dickey, Denair, Calif.

[73] Assignee: Trine Manufacturing Co., Inc., Turlock, Calif.

[21] Appl. No.: 226,660

[22] Filed: Aug. 1, 1988

[51] Int. Cl.$^5$ .............................................. B29C 27/00
[52] U.S. Cl. ..................................... 156/86; 156/215; 156/285; 156/448; 156/456
[58] Field of Search ................................ 156/456–458, 156/86, 212, 215, 291, 294, 448–451, 285, 444

[56] References Cited

U.S. PATENT DOCUMENTS

| | | | |
|---|---|---|---|
| 2,125,848 | 8/1938 | Miller | 493/109 |
| 3,292,503 | 12/1966 | Grobman | 156/285 X |
| 3,658,615 | 4/1972 | Amberg | 156/215 X |
| 4,371,571 | 2/1983 | McIntyre | 156/215 X |
| 4,406,721 | 9/1983 | Hoffman | 156/86 |
| 4,544,431 | 10/1985 | King | 156/449 X |
| 4,574,020 | 3/1986 | Fosnaught | 156/458 X |
| 4,735,668 | 4/1988 | Hoffman | 156/215 |

Primary Examiner—David Simmons
Attorney, Agent, or Firm—Lothrop & West

[57] ABSTRACT

An apparatus and method, for the application of solvent reactive, heat-shrink film or labels, to a container having a curvilinear, frusto-conical, or other irregular aspect to the configuration of its outer wall. Adhesive and solvent are applied, respectively, to the leading and trailing ends of a label in preparation for full wrap-applying same to a container. The leading end of the label is brought into adhesive contact with the container, and the container is spun about its axis to wrap the label therearound. At least a portion of the label seam, adjacent the irregular wall aspect of the container, is left free-standing or unsupported by the container wall. To ensure a positive seal within this unsupported seam portion, compressive forces are applied thereto as the trailing end of the label comes into initial contact with the underlying leading end. Thereafter, the label is subject to heat, causing the unsupported portions of the label to shrink and conform to the irregular configuration of the container.

17 Claims, 4 Drawing Sheets

APPARATUS AND METHOD FOR APPLYING A HEAT SHRINK FILM TO A CONTAINER

BACKGROUND OF THE INVENTION

A. Field of the Invention

The invention relates generally to an apparatus and method, for the application of a solvent reactive, heat-shrink film or label, to a container having a curvilinear, frusto-conical or other irregular aspect to the configuration of its outer wall. More specifically, the invention contemplates applying adhesive and solvent upon selective areas of a label, wrap applying a portion of the label completely around the container so that the overlapped ends form a strong seam, and then heating the label to conform the remaining portion to the curved, conical, or irregular section of the container.

It is well recognized that in certain applications, heat shrink labels provide a number of distinct advantages over paper and non-shrinkable plastic labels. For example, if the label or film is to be applied to a container or article having a curved, conical, or irregular surface underlying the label, the heat-shrink label can readily be shrunk to conform to the surface anomalies of the container. This conforming capability, in turn, provides an aesthetically pleasing appearance for the labeled container. And, in applications where the shrunken label extends around the bottom of the container, the label forms a sturdy base and insulates the heated or cooled contents from direct contact with the user's hand. However, the application of heat shrunk labels to such containers poses special problems not typically encountered in a more conventional setting, where the labels are non-shrinkable in nature, and the only aspect of the containers to be labeled is right-circular cylindrical, and straight-walled in configuration.

Solvent has proven an effective bonding agent for full wrap plastic or polymer labels, providing the mating ends of the label are brought into positive, and preferably compressive contact, quickly after application of solvent to the overlapping trailing end. Nevertheless, if the solvent is allowed to dry, even partially, before coming into compressive contact with the mating surface, a poor bond will form and the label ends will likely separate. This phenomenon is generally not a problem when labeling right-circular cylindrical containers, particularly where the only surface to be labeled is of uniform configuration. In this labeling application, the label is only intended to cover the right-circular cylindrical portions of the container, as opposed to any curved, conical, or irregular portions. In the former instance, the full extent of the label seam or overlapping ends is supported by the container wall at the initial moment of label end overlap. Consequently, the container wall provides a convenient backing support against which a rolling compressive force can be applied to effect a strong bond between the overlapping ends.

This rolling compressive force may be applied by a rotary, label transport vacuum drum cooperating with a curved, concentric, stationary roll-on pad, spaced approximately a container's diameter away from the periphery of the drum. The vacuum drum applies the label to the container and the roll-on pad causes the container to rotate and compressively wrap-apply the label thereto. Other apparatus, such as a linear, driven roll-on belt, or the like, working in conjunction with an opposing linear roll-on pad can be employed as well. Providing the label seam is supported and compressed during the initial bonding period, the solvent forms a very strong seal between the overlapping label ends.

A different situation is presented when a section of the label extends beyond the supportive wall of the container. This may occur when the label, prior to being heat shrunk, extends beyond the upper or lower end of the container, or where the container surface itself presents curves or discontinuities. In these applications, which appropriately call for the use of heat shrink label material, there is no backing or support for at least a section or portion of the label seam, against which the rolling compressive forces can be applied. As a consequence, when solvent is used as an agent to bond the overlapping trailing and leading ends of the label, inconsistent and faulty bonding may occur in this unsupported region of the label seam. And the larger the extent of the unsupported seam, the greater the likelihood that faulty bonding will occur.

The use of solvent to bond the ends of heat shrink labels is particularly difficult in the above-mentioned applications, since these labels tend to be particularly thin and flimsy in nature. Without the application of compressive forces against the label seam at the critical moment of initial end overlap, the limp label has a tendency to flex, sag, or buckle, all of which will lessen the chances of a good bond forming. Without a good bond between the overlapped ends, the subsequent application of heat and attendant stretching forces can easily cause label end separation, uneven shrinking, or an unsightly label seam.

B. Description of the Prior Art

The use of hot-melt adhesives and solvent reactive adhesives in a roll-fed labeling machine, is discussed in King, U.S. Pat. No. 4,544,431. Fosnaught, U.S. Pat. No. 4,574,020 teaches the gravure roll application of solvent upon both the leading and trailing ends of a label, before the label is wrapped around a container. U.S. Pat. No. 4,406,721, issued to Hoffmann, discloses the application of a heat shrinkable film to a container, whereafter heat is applied to free-standing portions of the label to shrink them onto the container. U.S. Pat. No. 4,735,668, granted to Hoffmann, teaches a method of applying a plastic label segment to a container, wherein hot melt adhesive is applied to the label's leading edge and solvent is applied to the label's trailing edge.

The applicant herein, in U.S. application Ser. No. 07/202,610 illustrates the use of ejection-applied hot melt adhesive and wipe-applied solvent, respectively, upon leading and trailing end portions of a label, before wrapping that label around a container.

SUMMARY OF THE INVENTION

The basic method and apparatus disclosed herein can be employed effectively to apply full-wrap labels about containers or articles having a variety of shapes. Each such container has a first outer wall section, defined by a major diameter, and a second outer wall section, defined by a minor diameter. Owing to the irregular and varying configurations of such containers, the minor diameter will not typically be of a fixed, or determinate measure, unless the container has stepped walls. Nevertheless, the term minor diameter is employed herein, as any diameter taken or measured within the second outer wall section will be less than the major diameter of the container under consideration.

One example is a generally right-circular cylindrical container, having a narrowed and curved upper neck portion, and perhaps a rounded base, with inwardly curved lower wall portions. The invention is also well adapted to label a cup, or dish shaped container, having an upper right-circular cylindrical portion, and lower curved or frustoconical walls, converging inwardly to a lesser diameter base. Other variations contemplated herein include containers being stepped, circular, or elliptical in vertical cross-section. In each instance, at the moment the ends of the label are brought into overlapping contact, at least a portion of the label seam is free-standing or unsupported by the container wall.

The invention is directed toward an apparatus and method for forming a positive seal or bond, particularly in the unsupported portions of the label seam, before subjecting the label to heat and causing the unsupported portions of the label to adapt to the irregular configuration of the container.

Adhesive is applied to the leading end and solvent is applied to the trailing end, of a solvent reactive, heat-shrink label. During this pre-application label treatment process, the label may be supported and transported by a rotary vacuum drum, or other label transport mechanisms well known in the art. The leading end of the label is brought into positive or compressive contact with a container, or other article, providing an adhesive bond between the two. The container is thereafter spun about its axis to wrap the full extent of the label around the container.

As the trailing end of the label comes into initial contact with the underlying leading end of the label, a compressive force is applied to the unsupported or free standing seam portion of the label. This force is conveniently provided by pneumatic means, such as a jet of air directed generally outwardly from the axis of the container against the inner wall of the unsupported seam. The wall of the vacuum drum or other label transport apparatus provides a convenient backing against which the pneumatic force can work. Mechanical means, such as a wheel, a finger, or the like could also be substituted for the air jet to apply the necessary compressive forces against the label seam. The application of such compressive force at the critical moment of initial contact between the leading and trailing ends of the label, is effective to maintain the two ends in intimate contact while the seam bond is formed.

Thereafter, the labeled container is briefly subjected to elevated temperatures as it passes through a heat oven, or the like, causing the heat sensitive label to shrink and conform to the underlying configuration of the container in a tight wrap.

DETAILED DESCRIPTION OF PREFERRED EMBODIMENT

Figure 1:
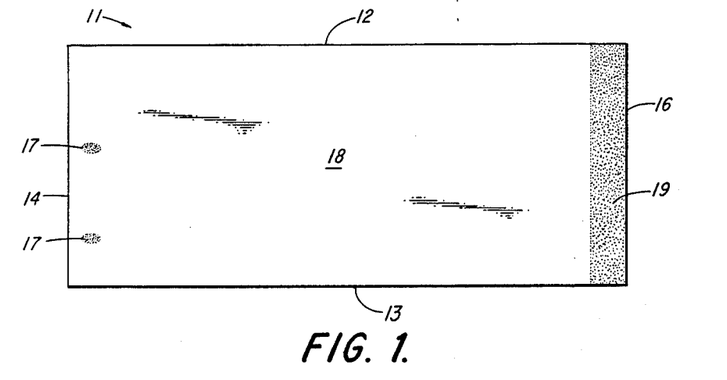
FIG. 1 is a plan view of the reverse side of a label for a right-circular cylindrical container, with appropriate adhesive and solvent applied thereto.

Turning now to FIG. 1, a solvent reactive film or label generally designated by the numeral 11 is provided. Label 11 is generally elongated and rectangular in configuration, having an upper edge 12, a lower edge 13, a leading end or edge 14, and a trailing end or edge, 16. Adhesive 17 is applied to at least one portion of the leading end 14 of the reverse side, or inner face 18 of the label. This adhesive is preferably a hot melt adhesive, but any suitable adhesive capable of adhering the leading end of the label to a container should perform satisfactorily. A strip or swath of solvent 19 is applied generally across the trailing end 16 of the label. Although any number of means can be employed to apply the adhesive and solvent to subject labels, the apparatus and method shown in my U.S. application Ser. No. 07/202,610 are well suited for handling the labels 11 and applying adhesive and solvent to them as contemplated herein.

Figure 3:
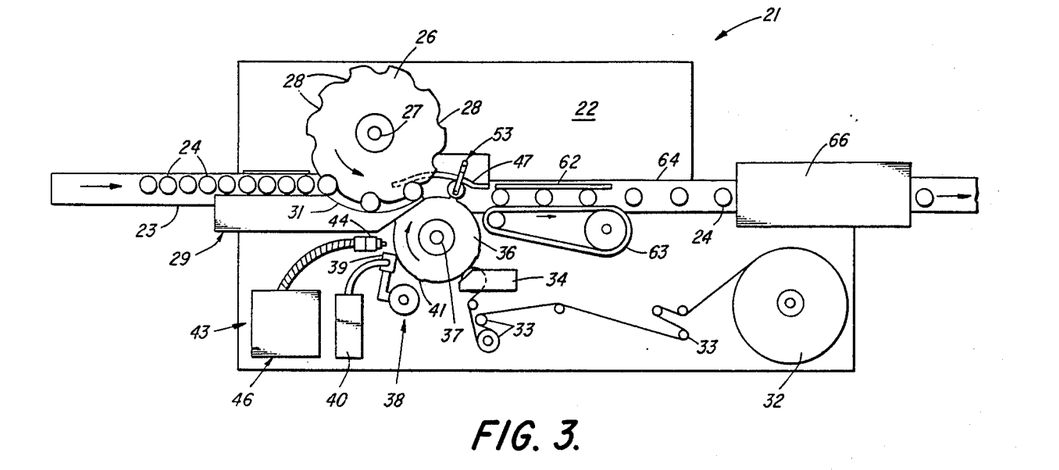
FIG. 3 is a top plan view, generally showing a labeling machine constructed in accordance with the invention.

FIG. 3 generally shows such labeling apparatus 21, as modified and improved by applicant's present invention. A frame or support plate 22 is disposed in the path of a feed conveyor 23, upon which containers or articles 24 are transported to an infeed starwheel 26. A vertical axle 27 supports the starwheel for rotation in a counterclockwise direction, as viewed in FIG. 3. Pockets or indentations 28 are provided about the outer periphery of the starwheel, to accommodate individual containers. A feed guide 29 includes an arcuate downstream portion 31, spaced from and concentric with the starwheel. As the starwheel rotates, the pockets 28 and the guide 29 are effective to separate, engage, and transport individual containers 24 until they come into contact with a respective label.

Heat shrink labels 11 are provided by a label roll 32, located on the frame 22 and adapted to supply a continuous strip of label material through an arrangement of feed rollers 33 to a cutter mechanism 34. The terminus of the strip is sucked against the periphery of a vacuum drum 36, rotating on a vertical axle 37. With an end portion of the strip under the suction control of the vacuum drum, the cutter mechanism 34 severs the strip to create an individual label of the desired length. The entire label is immediately drawn onto the vacuum drum, and continuous clockwise rotation of the drum thereafter transports the label 11 to the solvent and adhesive application stations.

In anticipation of its application to a container, each label is pre-treated, or conditioned by the application of adhesive and solvent materials to selected portions of its reverse side. This can be accomplished by a number of material application mechanisms, working alone or in combination with physical features upon the periphery of the vacuum drum.

Applicant herein prefers the apparatus made the subject of his U.S. Pat. No. 4,844,770 wherein, adhesive is ejection-applied upon the leading edge and solvent is wipe applied upon the trailing edge of a label being transported by a rotating vacuum drum. Accordingly, the present invention includes a solvent wiper assembly 38, effective to apply an area, or band, or stripe of solvent upon the exposed inner face of the label. The wiper assembly 38 includes an application element 39 manufactured from a porous felt, or sponge like material, on and through which the liquid solvent can transfer readily. Solvent is supplied to the application element 39 by means of a solvent reservoir 40, and associated supply and return hoses shown in FIG. 3.

The vacuum drum 36 includes raised pads 41, or ridges upon and about its periphery. These pads extend radially outwardly from the drum's major surface 42. (See FIG. 5). The cutter mechanism 34 is synchronized with the rotational position of the vacuum drum so that as each label is separated from the parent strip and captured by the drum, the trailing end 16 will overlie a respective pad 41. The selected trailing end portion of the label is thereby caused to protrude or extend radially outwardly farther than the major surface 42 of the drum. The remaining portion of the label lies upon the major surface of the vacuum drum.

Figure 5:
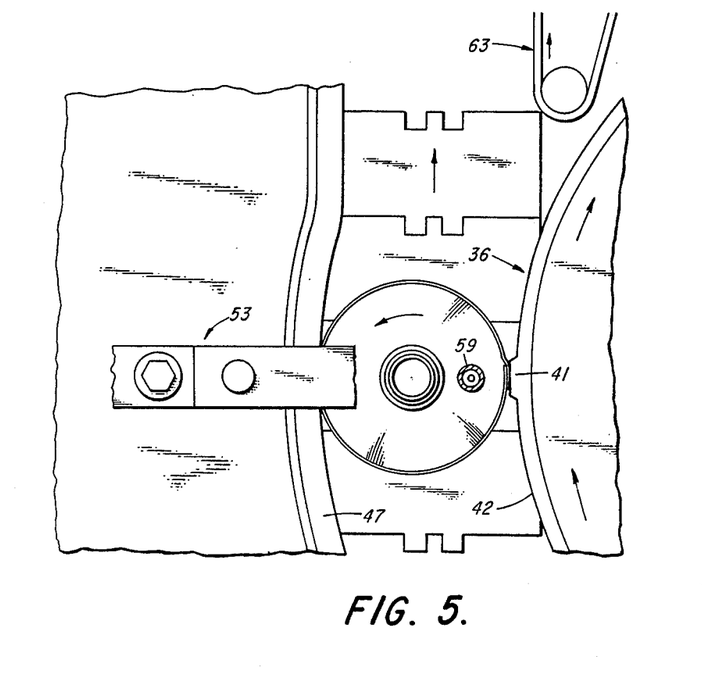
FIG. 5 is a fragmentary top plan view of the labeled container of FIG. 4, a portion of the pneumatic applicator assembly being broken away to show the relationship of the components at the moment of label seam formation.

The application element 39 of the wiper assembly 38 is spaced a predetermined distance from the surface 42 so that the element will come into contact only with the trailing end 16 of the label. Thus, by means of the radially extending pads 41, solvent is wipe-applied only to the trailing end of each label as it is transported past the solvent saturated element 39. The solvent reacts immediately with the label material, causing the trailing end 16 to soften, in preparation for effecting a seal when wrapped over the leading end 14.

A hot melt adhesive applicator 43 includes a glue head 44, appropriately supplied with hot melt adhesive by means of an adhesive tank and an associated pump generally designated by the numeral 46. A heated supply line, not identified, carries the adhesive to the glue head 44.

The glue head 44 is controlled by an electronic synchronization unit (not shown), responsive to the rotational position of the vacuum drum, to correlate the action of the glue head with the rotational position of the label. In the presently described embodiment of the invention, the synchronization unit and glue head are configured to eject preferably two dots of adhesive 17, upon the leading end 14 of each label (see FIG. 1). The glue head 44 thus includes a pair of discharge orifices adapted to space the adhesive dots across the leading end.

To avoid physical interference between the pads 41 and the glue head 44, the head 44 is spaced radially outwardly from the pads, a slight distance. The combination of the fixed, raised pads on the vacuum drum, with the solvent wiper assembly and hot melt adhesive applicator constructed and operated as described above, provides an effective system for applying adhesive and solvent to selected portions of a label.

Nevertheless, other systems well known and described in the prior art could be adapted to pre-treat the labels as contemplated herein. For example, the adhesive and solvent could be applied by means of separate adhesive and solvent drum roll applicators. Each applicator could be radially shifted, inwardly and outwardly, into synchronized engagement and disengagement with the selected portion of a passing label. While such a system could work for the present application, such reciprocating transport of the adhesive and solvent roll applicator mechanisms may only be feasible at operational speeds which are lower than desired.

In yet another system adaptable for use herein, moveable pads may be provided upon the surface of the vacuum drum. Radial extension and withdrawal of the pads brings only certain portions of the label into contact with stationary adhesive and solvent roll applicator mechanisms adjacent the periphery of the vacuum drum.

It will be appreciated, then, that prior art systems other than the applicant's preferred system are available to effect the desired conditioning or pre-treatment of the labels; and applicant intends that all such systems are included within the overall apparatus and method contemplated herein.

In the operation of applicant's device, the articles or containers 24 are carried upon the conveyor 23 until they meet the rotating starwheel 26. As set forth above, the starwheel separates, engages, and transports individual containers into tangential contact with the adjacent periphery of the vacuum drum 36. Concurrent with the operation of this container handling mechanism, strip material is supplied by the label roll 32, cut into individual labels by the cutter mechanism, and vacuum secured upon the rotating vacuum drum 36. Solvent and adhesive are applied, as described above, while each label passes the applicator stations. Each label, with adhesive on its leading end and solvent upon its trailing end, advances in a clockwise direction upon the vacuum drum, until the leading end comes into tangential contact with a respective container presented by the starwheel.

The labeling operation is completed by rolling the container and the adhesive attached label between the vacuum drum and an opposing, curved roll-on pad 47, spaced from and concentric with the vacuum drum (See FIG. 3). The solvent treated trailing end 16 is thereby caused to overlap and seal against the underlying leading end of the label. Making reference to FIGS. 2 and 5, rolling compressive forces are initially applied to the seam by the stationary roll-on pad 47 and the pad 41 upon the rotating vacuum drum. The inwardly applied compressive forces are effective to act against a portion 48 of the label seam, supported by a first outer wall section 49 of the container, forming a positive seal or bond in that seam region.

There remain, however, one or more overlapping portions of the label along the seam unsupported or backed by the first outer wall section 49. Being unsupported, at least on the inner container side, the previously described rolling compressive forces are not generally effective along the seam in this area of the label to form a positive solvent bond. If the unsupported extent of the seam is small, additional measures need not always be taken as the forces compressing the supported portion of the seam tend to bring the unsupported label ends together as well. It is in those situations where the unsupported label seam is significant in length or extent, that faulty bonding is likely to occur.

Figure 2:
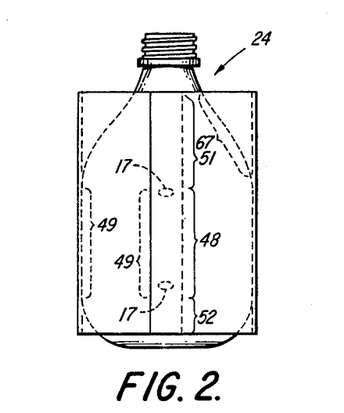
FIG. 2 is a side elevation of a container receiving the label of FIG. 1, before heat is applied thereto.

The container 24, shown in FIG. 2, is illustrative of the aforementioned examples. Relatively significant in extent or length is an upper unsupported portion 51 of the label seam. And, at the other end of the seam is a fairly short, lower unsupported portion 52. While the present invention can be employed advantageously to effect better seals in both portions, for purposes of clarity and simplicity, the disclosure herein will be directed particularly toward the longer, upper unsupported portion 51.

In accordance with the present invention, there is provided a pneumatic applicator assembly, generally designated by the numeral 53. Making reference to FIG. 4, the assembly 53 includes a base plate 54, a vertical post 56, and a horizontal bracket 57 having a clamp piece 58 at its outer extremity, adjustably supporting an air nozzle 59. A constant stream of air pressure is supplied to the nozzle 59 by a conventional air compressor, or the like, not shown. An in series valve 61 is provided to adjust the desired and necessary amount of air flow through the nozzle.

Figure 4:
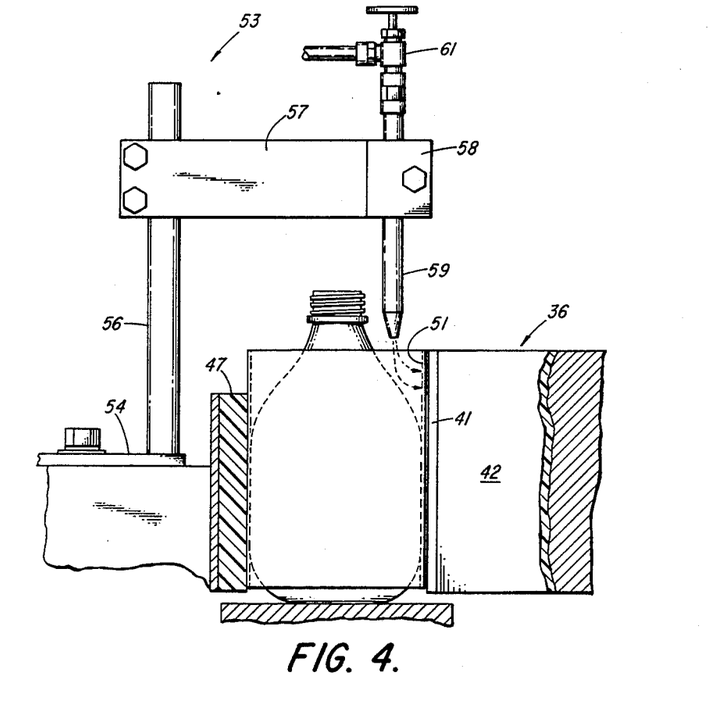
FIG. 4 is a fragmentary, side elevational view of the pneumatic applicator assembly, a labeled container, and a portion of the vacuum drum, the roll-on pad and container conveyor being shown in cross-section.

As is evident from the drawings, the pneumatic applicator assembly 53 is adjustable horizontally, vertically, and rotationally about the axis defined by the post 56 so as to locate the discharge end of the nozzle 59 within a region immediately adjacent the unsupported portion 51 of the inner wall of the label seam. The jet of air is effective to apply compressive pressure to the seam, or overlapping portion of the label, unsupported by the outer wall section of the container. FIG. 4 shows that the air, in this application, is directed downwardly, being partially deflected outwardly by the container wall against the inner wall of the label seam. The vacuum drum 36 acts as a backing or support against which these forces can act, to effect a good solvent bond.

It has been determined that these compressive forces need not be great to effect the desired result. What is critical, is the application of some compressive force against the unsupported portion of the label seam at the very moment the label ends initially overlap. If this compressive force, however moderate, is not quickly applied to the seam, and the solvent is allowed to dry or set up, the opportunity for forming a good bond is lost.

As to variations upon the basic configuration presented herein, the pneumatic forces could be pulsed, and the nozzle farther withdrawn from the immediate region of the seam, if necessary, owing to physical interference between the nozzle and a different container or label. It will also be appreciated that pneumatic forces could be applied from below the container, through a perforated conveyor, or the like, to apply a compressive force against the lower unsupported portion 52, of the label seam. And, while the pneumatic system described herein has performed well, alternative constructions for effecting the necessary compressive forces may be employed to practice the invention. These constructions may include a rotary wheel or a mechanical finger, adapted to press outwardly against the unsupported label seam backed by the vacuum drum wall. It is evident that electromagnetic or electrostatic forces, acting individually upon the label or in combination with the label transport mechanism, could also apply the required compressive force.

To complete the labeling process, a secondary roll on pad 62 and an opposing driven belt 63, straddling either side of the discharge conveyor 64, may be employed. As the containers are passed through the elevated temperatures existing within a heat shrink oven 66, the label material shrinks to conform to the configuration of the container. For example, the entire upper unsupported portion 51 will shrink around a second outer wall section 67, or inwardly curving upper neck, of the container. Likewise, the lower unsupported portion of the label will shrink around a respective curved outer wall section of the container. Thus, applicant's apparatus and method for applying such a heat shrink label, ensure a strong label seam that will provide an attractive labeled container following the appropriate application of heat to the label.

An alternative embodiment of applicant's invention is also disclosed herein. Since many components and operational aspects of the alternative embodiment are similar or identical to those of the embodiment just described, only the significant differences will be presented in the discussion to follow. And, where those corresponding components or elements of the labeling apparatus are the same as those previously described, the same numerical identifiers will be utilized in the description and drawings herein.

Figure 9:
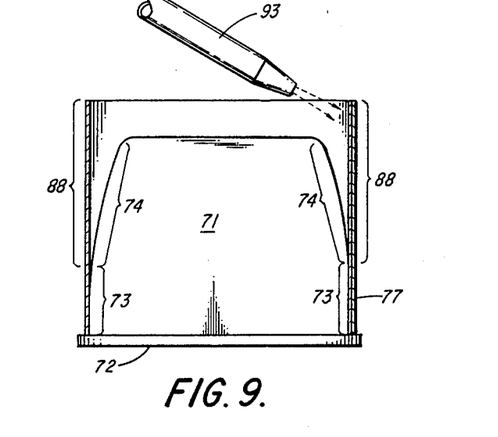
FIG. 9 is a fragmentary cross-sectional view taken along the lines 9—9, in FIG. 7.

The second embodiment is adapted to label a cup-shaped container 71, which, owing to its nature, is more readily labeled with its top, or cover 72, facing directly down. As is shown most clearly in FIG. 9, the container 71 has a first outer wall section 73, right-circular cylindrical in configuration, defining the major diameter of the container. A second outer wall section 74, which is curved and inwardly converging in nature, describes a minor or lesser diameter of the container. A base or bottom 76 is also provided, to complete the construction of the container.

Figure 6:
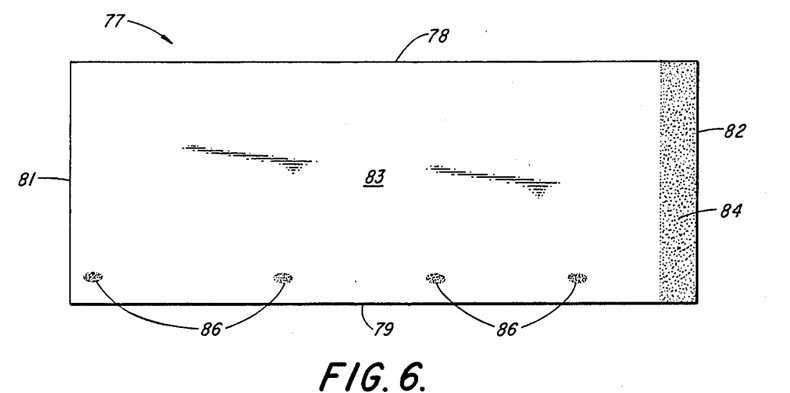
FIG. 6 is a plan view of the reverse side of a label for a cup, or dish-shaped container, with appropriate adhesive and solvent applied thereto.

A label 77, generally rectangular in configuration, having an upper elongated edge 78 and a lower elongated edge 79, is also provided (See FIG. 6). Elongated edges 78 and 79 span the distance between a leading edge or end 81, and a trailing edge or end 82. Adhesive and solvent are placed upon the reverse side or face 83 of the label, to condition or pre-treat the label for the labeling operation, as described previously. Accordingly, solvent is similarly wipe-applied in a band or swath 84, across the trailing end 82.

The adhesive, however, is applied in a somewhat different location and pattern, owing to the particular configuration of the cup container 71. A series of dots of adhesive 86 is ejection applied along the lower edge 79 of the label. The position and number of the adhesive dots are designed to adhere the lower edge of the label securely around the first outer wall section 73 of the container. While the particular number of adhesive dots will vary with the length of the label employed, it is important that there be at least one adhesive dot, or the like, adjacent the leading end 81 to effect initial bonding between the container and the label. This is important, of course, to ensure that the label wraps around the container as it is rotated by the labeling apparatus, as previously described. The remaining adhesive dots are necessary to secure at least the lower edge of the label to the container when the remainder of the label is heat shrunk to conform to the container's curved outer wall.

To effect this different adhesive pattern, the glue head of the adhesive applicator has only one orifice, and the electronic drive and control circuitry is programed to actuate the head a plurality of times for each passing label. Otherwise, the label handling and pre-treatment apparatus employed for the alternative embodiment is identical with that already described.

Alternative adhesive applicators and methods of applying adhesive could also be utilized. It should also be noted that while applicant prefers to apply a series of adhesive dots along the label's edge, a band or stripe of adhesive could be substituted.

The container handling apparatus, including the starwheel, feed guide, and roll-on pad are also similar to those like components previously illustrated, modified, of course, in size and configuration to accommodate the container 71. The container handling apparatus functions likewise to present individual containers to the periphery of the vacuum drum, whereupon it comes into contact with a respective label, and is spun upon its axis between the vacuum drum and the roll-on pad.

Figure 7:
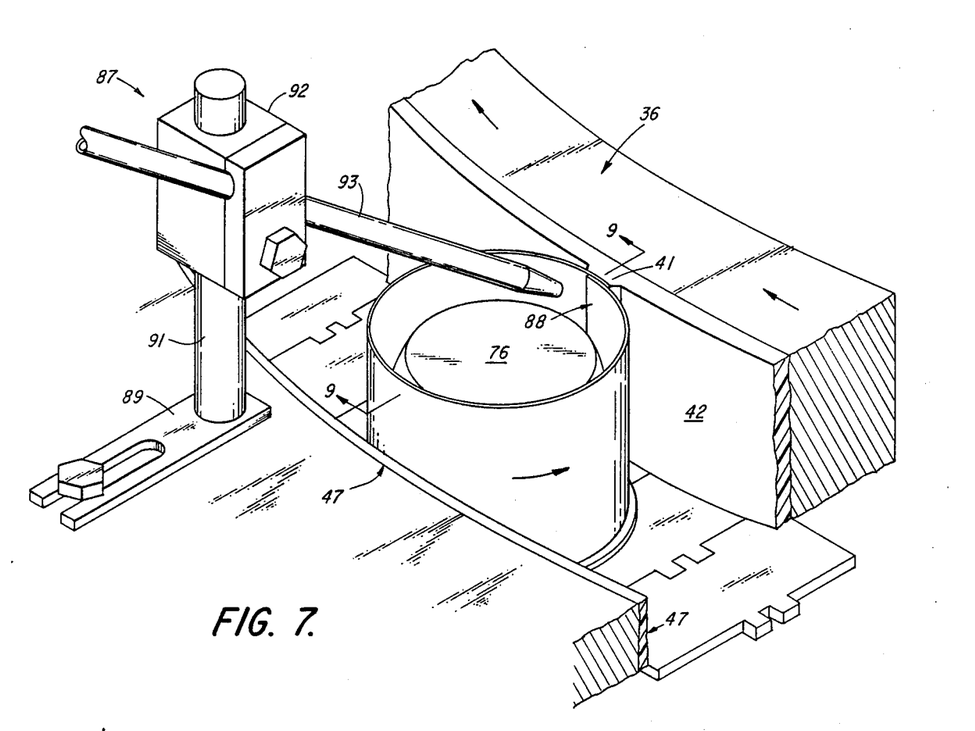
FIG. 7 is a fragmentary isometric view of a labeled cup container and portions of the labeling apparatus.

Making particular reference, now, to FIG. 7, the container 11 is shown at the moment the full wrap label has been initially applied. The alternative embodiment also includes a pneumatic applicator assembly 87 to effect a positive bond or seal between the overlapping ends of the label, in the unsupported portion 88. The assembly 87 includes a base piece 89, and a support rod 91 extending vertically from one end thereof. At the upper end of the rod 91 is a clamping block 92, adapted to maintain air nozzle 93 in the desired position.

Figure 8:
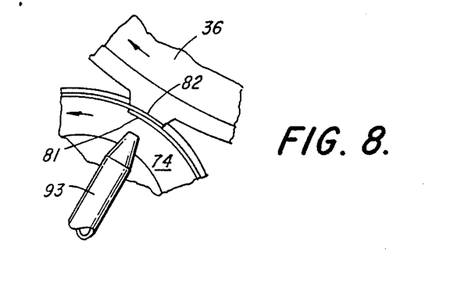
FIG. 8 is a fragmentary top plan view of the container of FIG. 7, taken to an enlarged scale, showing the label seam at the moment of bond formation.

The nozzle 93 is oriented more directly toward the unsupported label seam, than previously disclosed in the first embodiment. This more direct application of compressive force is beneficial in that the unsupported portion 88 is relatively large, and therefore more susceptible to flexing, sagging, or buckling. FIG. 8 illustrates, in detail, how the nozzle 93 applies pneumatic force against the inwardly facing side of the leading end 81, to effect a strong solvent seal between the overlapping ends 81 and 82.

Figure 10:
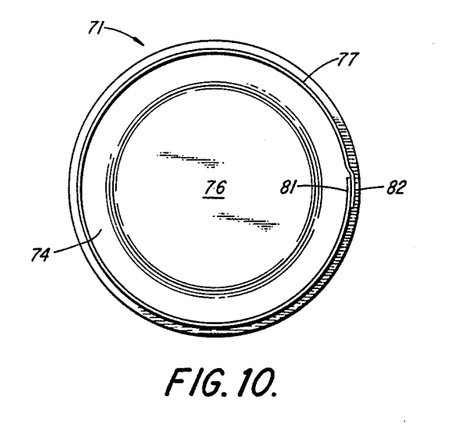
FIG. 10 is a bottom plan view of the labeled cup container, before the label is shrunk; and, FIG. 11 is a view of the container as shown in FIG. 10 following the application of heat to the label.
Figure 11:
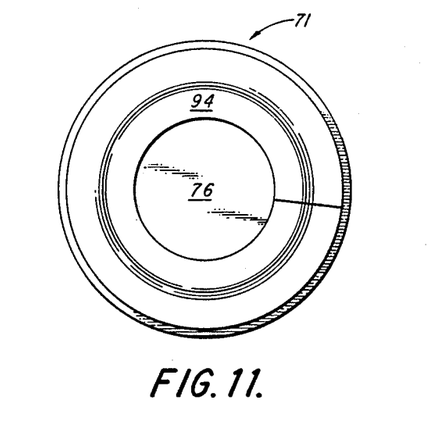

After the labeled container passes the pneumatic applicator assembly, it is transported to a heat shrink oven, where the elevated temperatures cause the unsupported portion 88, to shrink and conform to the configuration of the second outer wall section 74. A remaining end portion of the label shrinks upon the base 76, to form an annular cover ring 94. A comparison of FIGS. 10 and 11 reveals the manner and extent to which the unsupported portion typically shrinks after passage through the heat shrink oven.

It is significant to note that in this labeling operation, the edge of the label attached initially to the container by means of adhesive acts to restrain or anchor one elongated edge while the remainder of the label shrinks around the container. Having this anchored edge extend entirely around the container, the label shrinks uniformly and consistently when heated to form a tight, clean wrap around the cup's wall and bottom elements.

It will be appreciated, then, that I have provided an apparatus and method for applying a solvent reactive heat shrink label, to articles or containers having irregular or varying outer wall configurations.

What is claimed is:

1. A method for applying a solvent reactive heat shrink film to a container having a first outer wall section, defined by a major container diameter, and having a second outer wall section, defined by a minor container diameter, comprising the steps of:
    (a) disposing the film upon the outer periphery of a rotary vacuum drum, with the inner face of the film being exposed;
    (b) applying adhesive to the inner face of the leading end of the film;
    (c) applying solvent to said inner face of the trailing end of the film;
    (d) bringing said leading end of the film into adhesive contact with said first outer wall section of the container;
    (e) wrapping the film around the container, and overlapping the outer face of said leading end of the film with said solvent treated inner face of said trailing end;
    (f) compressively rolling the container against said vacuum drum, forming an overlapping solvent seal along a portion of the film seam supported by the first outer wall section of the container, and simultaneously applying compressive pressure to the inner wall of said film seam along a portion of said film seam unsupported by said first outer wall section, while the outer wall of said film seam is backed by said vacuum drum; and,
    (g) applying heat to said unsupported portion of the film, shrinking said unsupported portion around said second outer wall section of the container.

2. An apparatus for applying a solvent reactive heat shrink film to a container having a first outer wall section, defined by a major diameter, and having a second outer wall section, defined by a minor container diameter, comprising:
    a. a rotary vacuum drum for transporting a film strip upon its outer periphery, said strip having an exposed inner face;
    b. means for applying adhesive to said inner face of the leading end of the film;
    c. means for applying solvent to said inner face of the trailing end of the film;
    d. means for bringing a container into tangential contact with said adhesive on said film;
    e. a curved roll-on pad, spaced from and concentric with said vacuum drum, said pad cooperating with said vacuum drum to rotate the container and wrap the adhesively attached film around the container, compressively forming an overlapping solvent seal along a portion of the film seam supported by the first outer wall section of the container;
    f. means for applying compressive pressure to the inner wall of said film seam along a portion of the label unsupported by said first outer wall section, while the outer wall of said film seam is backed by said vacuum drum;
    g. means for applying heat to said unsupported portion of the film, shrinking said unsupported portion around said second outer wall section of the container.

3. An apparatus as in claim 2 wherein said means for applying compressive pressure includes a pneumatic applicator providing a jet of air directed toward the inner wall of said film seam.

4. An apparatus as in claim 3 in which said first outer wall section is right circular cylindrical in configuration.

5. An apparatus as in claim 4 in which said second outer wall section is inwardly curving from said right circular cylindrical section.

6. An apparatus as in claim 3 in which said adhesive is hot melt adhesive.

7. An apparatus as in claim 3 in which said means for applying adhesive includes an adhesive ejector, spaced from the film.

8. An apparatus as in claim 3 in which said means for applying solvent includes a solvent saturated applicator element and means for bringing only said trailing end of the film into contact with said applicator element.

9. An apparatus as in claim 8 in which said means for bringing only said trailing end into contact with said applicator element includes a raised pad on the outer periphery of said vacuum drum underlying said trailing end, said applicator element being spaced a predetermined distance from said outer periphery so that said applicator element will come into contact only with said trailing end.

10. An apparatus for applying a solvent reactive heat shrink film to a container having a first outer wall section defined by a major container diameter, and having a second outer wall section defined by a minor container diameter, comprising:
   a. a rotary vacuum drum for transporting a film strip upon its outer periphery, said strip having an exposed inner face.
   b. means for applying adhesive along one elongated edge of the inner face of the film, extending substantially from the leading end of the film to the trailing end of the film;
   c. means for applying solvent across said inner face of said trailing end, extending substantially from said one elongated edge to the other elongated edge of the film;
   d. means for bringing a container into tangential contact with said adhesive on said film;
   e. a curved roll-on pad, spaced from and concentric with said vacuum drum, said pad cooperating with said vacuum drum to rotate the container and wrap the adhesively attached film around the container, compressively forming an overlapping solvent seal along a portion of the film seam supported by the first outer wall section of the container;
   f. means for applying compressive pressure to the inner wall of said film seam along a portion of the label unsupported by said first outer wall section, while the outer wall of said film seam is backed by said vacuum drum;
   g. means for applying heat to said unsupported portion of the film, shrinking said unsupported portion around said second outer wall section of the container.

11. An apparatus as in claim 10 in which said first outer wall section is right circular cylindrical in configuration.

12. An apparatus as in claim 11 in which said second outer wall section is inwardly curving from said right circular cylindrical section.

13. An apparatus as in claim 10 in which said adhesive is hot melt adhesive.

14. An apparatus as in claim 10 in which said means for applying compressive pressure to said unsupported portion of the film comprises a pneumatic applicator providing a jet of air directed toward the inner wall of said film seam.

15. An apparatus as in claim 10 in which said means for applying adhesive includes an adhesive ejector, spaced from the film.

16. An apparatus as in claim 10 in which for applying solvent includes a solvent saturated applicator element and means for bringing only said trailing end of the film into contact with said applicator element.

17. An apparatus as in claim 16 in which said means for bringing only said trailing end into contact with said applicator element includes a raised pad on the outer periphery of said vacuum drum underlying said trailing end, said applicator element being spaced a predetermined distance from said outer periphery so that said applicator element will come into contact only with said trailing end.

* * * * *

UNITED STATES PATENT AND TRADEMARK OFFICE
CERTIFICATE OF CORRECTION

PATENT NO. : 4,923,557
DATED : May 8, 1990
INVENTOR(S) : Daniel M. Dickey

It is certified that error appears in the above-identified patent and that said Letters Patent is hereby corrected as shown below:

In Column 5, line 7, delete "No. 4,844,770" and substitute --No. 4,844,760--.

Signed and Sealed this

Fourteenth Day of January, 1992

Attest:

HARRY F. MANBECK, JR.

Attesting Officer     Commissioner of Patents and Trademarks